(12) United States Patent  
Panikkath et al.

(10) Patent No.: US 8,755,456 B2
(45) Date of Patent: Jun. 17, 2014

(54) WAVEFORM SCALING IN WIRELESS TRANSMITTERS

(75) Inventors: Vinod V. Panikkath, San Diego, CA (US); Vijay K. Chellappa, San Diego, CA (US); Bhushan Shanti Asuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 13/415,572

(22) Filed: Mar. 8, 2012

(65) Prior Publication Data

US 2012/0230447 A1    Sep. 13, 2012

Related U.S. Application Data

(60) Provisional application No. 61/450,932, filed on Mar. 9, 2011.

(51) Int. Cl.
*H04L 25/49* (2006.01)
*H04L 27/00* (2006.01)

(52) U.S. Cl.
USPC .......................................... 375/296; 375/316

(58) Field of Classification Search
USPC ............. 375/296, 316, 395, 376; 455/91, 522
See application file for complete search history.

(56) References Cited

U.S. PATENT DOCUMENTS

| 7,456,773 | B1 | 11/2008 | Seo et al. |
| 7,693,494 | B2 | 4/2010 | Litmanen et al. |
| 8,036,301 | B2 | 10/2011 | Gilberton et al. |
| 8,503,950 | B1 * | 8/2013 | Dick ................................ 455/91 |
| 2006/0030352 | A1 * | 2/2006 | Kiran et al. .................... 455/522 |
| 2006/0160499 | A1 | 7/2006 | Puma |
| 2010/0239049 | A1 | 9/2010 | Horisaki |

FOREIGN PATENT DOCUMENTS

| FR | 2823385 A1 | 10/2002 |
| WO | 9738505 A1 | 10/1997 |
| WO | 2010064791 A2 | 6/2010 |

OTHER PUBLICATIONS

Chehri, et al. "Energy-Aware Multi-Hop Transmission for Sensor Networks based on Adaptive Modulation" 2010 IEEE 6th International Conference on Wireless and Mobile Computing, Networking and Communications, pp. 203-207.
International Search Report and Written Opinion—PCT/US2012/028641—ISA/EPO—Jul. 5, 2012.

* cited by examiner

*Primary Examiner* — Khai Tran
(74) *Attorney, Agent, or Firm* — William M. Hooks

(57) ABSTRACT

A wireless device for waveform scaling is disclosed. The wireless device includes a modulator that increases a magnitude of a peak digital code beyond a maximum available digital code for transmit power levels below a transmit power threshold to produce an adjusted digital code. The magnitude of the peak digital code is not increased beyond the maximum available digital code for transmit power levels above the transmit power threshold. The wireless device also includes a digital-to-analog converter that converts the adjusted digital code into an analog signal.

28 Claims, 8 Drawing Sheets

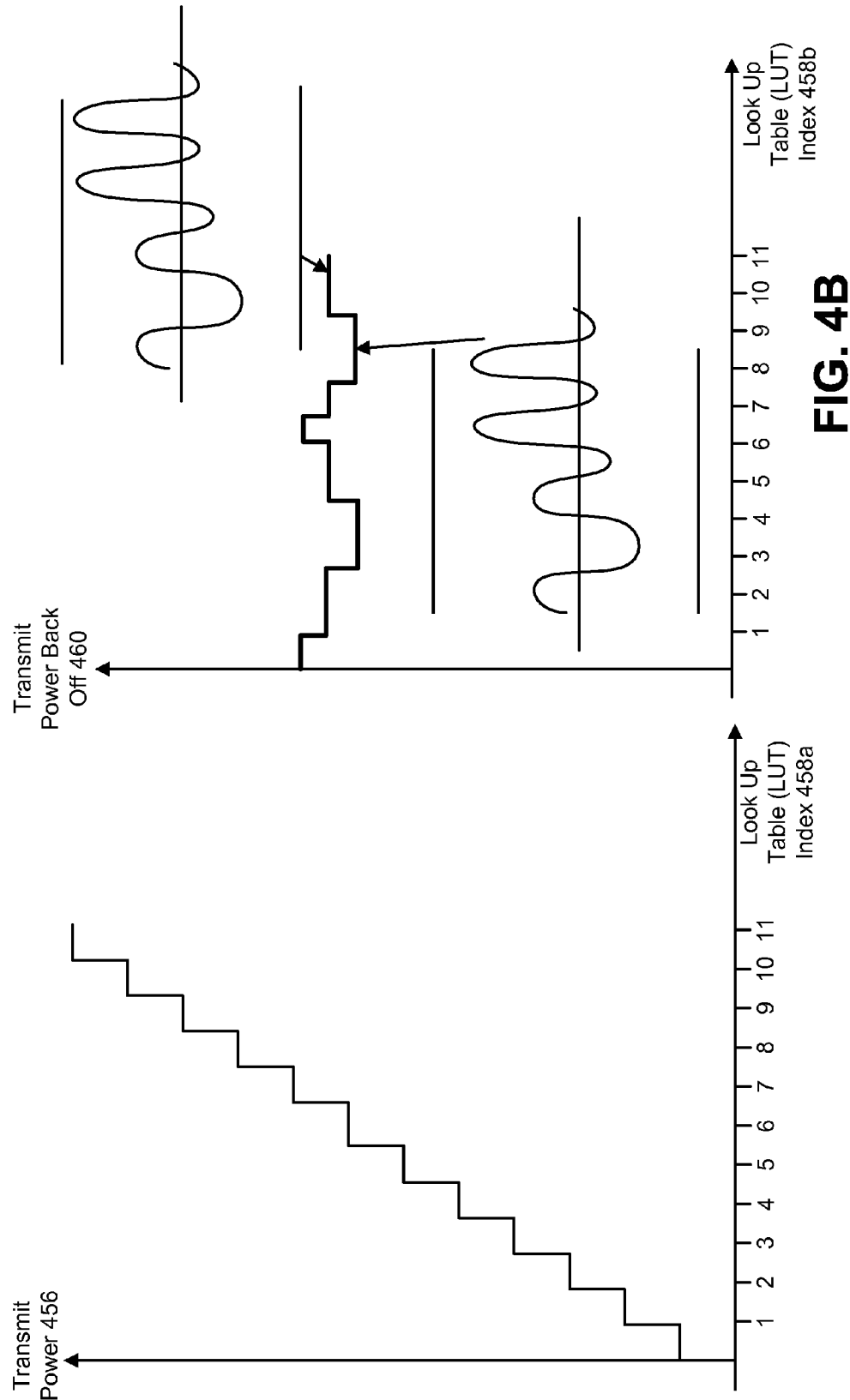

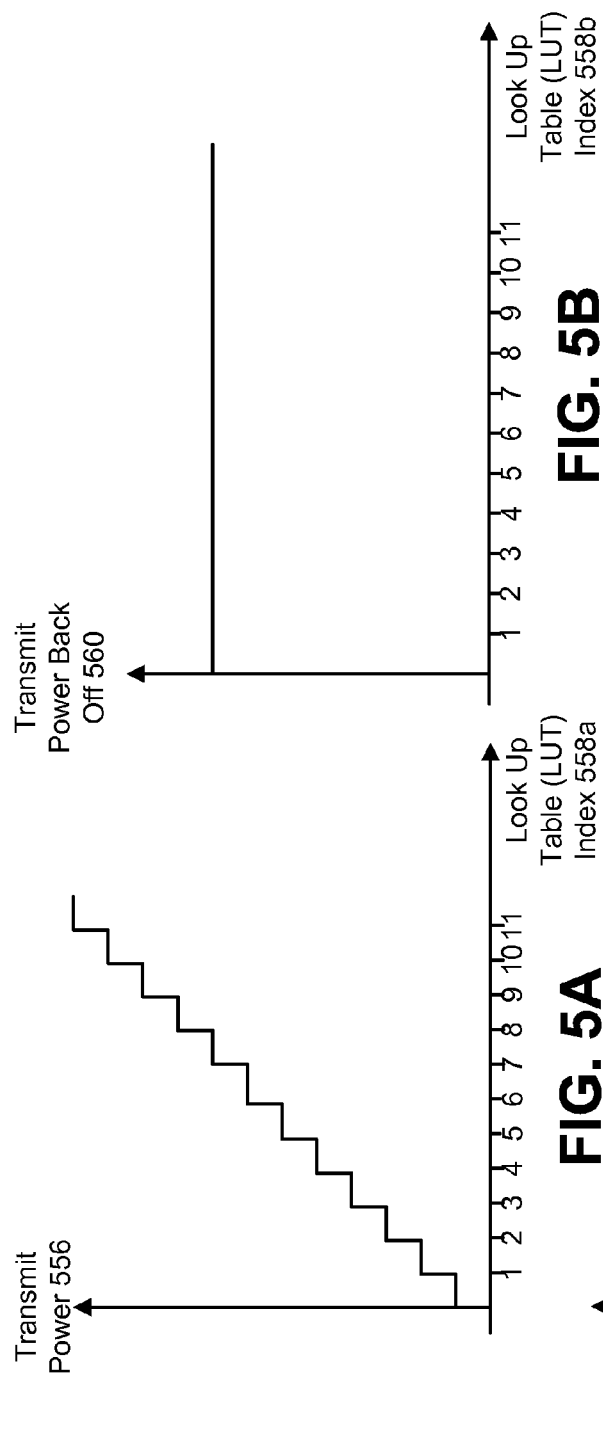
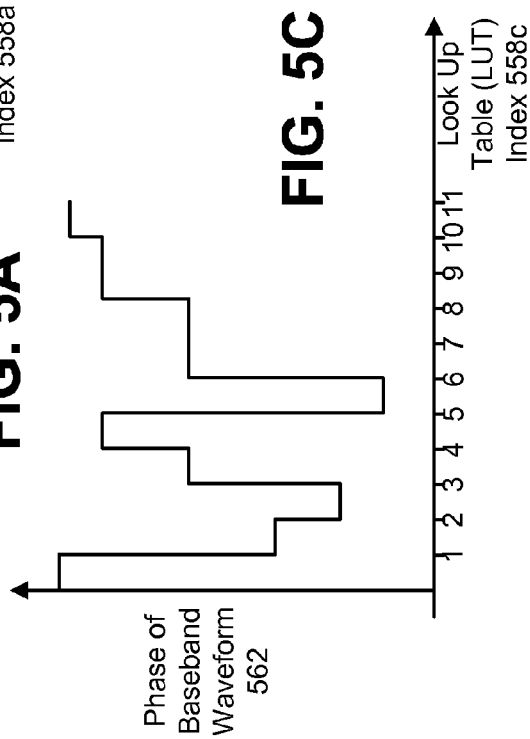

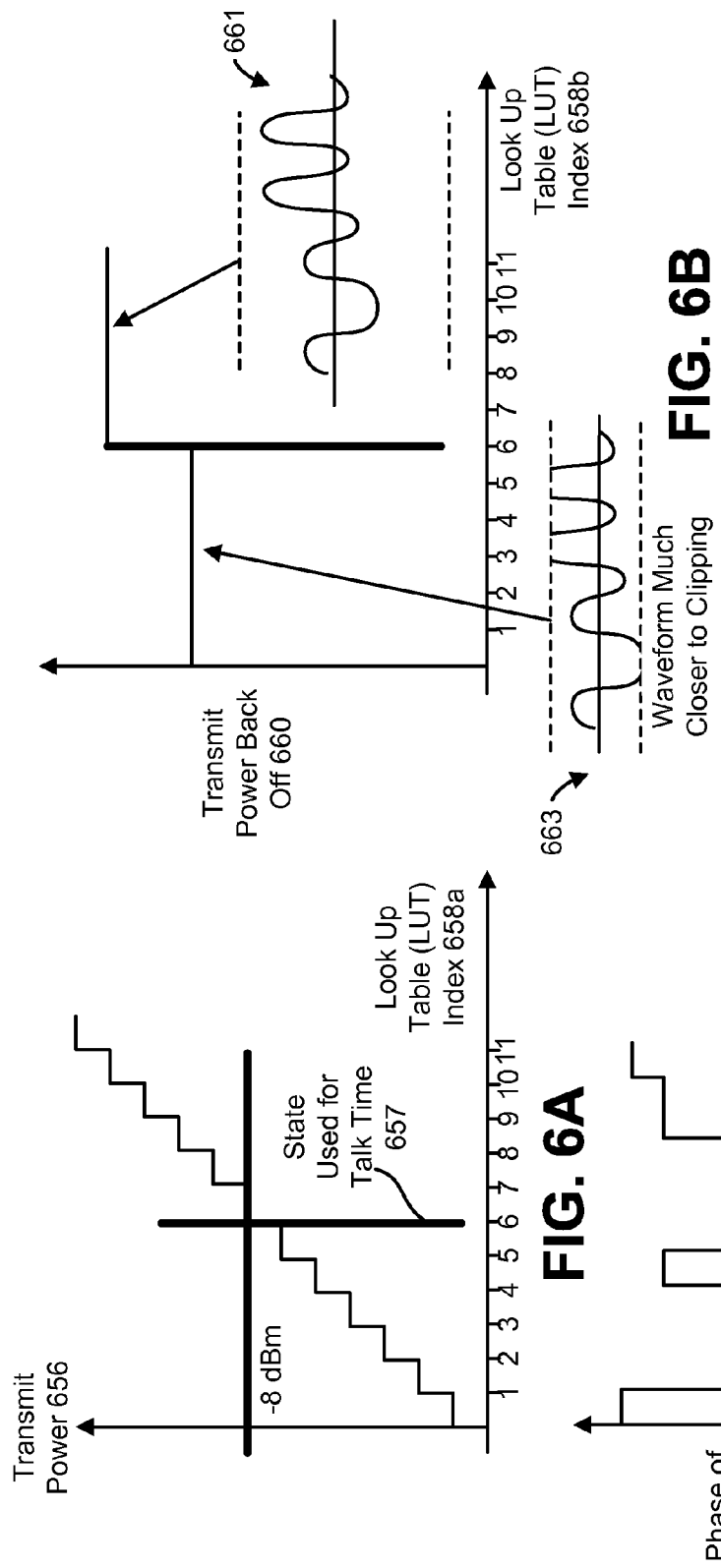

WAVEFORM SCALING IN WIRELESS TRANSMITTERS

RELATED APPLICATIONS

This application is related to and claims priority from U.S. Provisional Patent Application Ser. No. 61/450,932 filed Mar. 9, 2011, for "Waveform Scaling in Wireless Transmitters."

TECHNICAL FIELD

The present disclosure relates generally to communication systems. More specifically, the present disclosure relates to waveform scaling in wireless transmitters.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

Mobile devices may include a variety of circuits used during operation. For example, an oscillator may be used to synchronize various circuits across a board or integrated circuit within a mobile device. Furthermore, different circuits within a mobile device may operate using different frequencies. Therefore, mobile devices may generate multiple reference signals for different purposes.

Wireless devices may transmit at different power levels, depending on various criteria. However, it may be desirable to conserve current to extend battery life of wireless devices. Therefore, benefits may be realized by waveform scaling in a wireless transmitter.

SUMMARY OF THE INVENTION

A wireless device for waveform scaling is disclosed. The wireless device includes a modulator that increases a magnitude of a peak digital code beyond a maximum available digital code for transmit power levels below a transmit power threshold to produce an adjusted digital code. The magnitude of the peak digital code is not increased beyond the maximum available digital code for transmit power levels above the transmit power threshold. The wireless device also includes a digital-to-analog converter that converts the adjusted digital code into an analog signal.

In one configuration, the modulator determines the adjusted digital code using a look up table that includes entries based on transmit power levels for the wireless device. The wireless device may consume less overall power at look up table entries when the magnitude of the peak digital code is increased beyond the maximum available digital code than when the magnitude of the peak digital code is not increased beyond the maximum available digital code. The modulator may modulate a received baseband signal and produce a digital code that comprises the peak digital code. The increase of the peak digital code may include scaling the magnitude of the peak digital code by at least as much as a gain step between successive entries in the look up table.

The transmit power threshold may be 20 dB below a peak transmit power for the wireless device. The maximum available digital code may be 4096. Increasing the magnitude of the peak digital code may include increasing the peak digital code beyond a maximum available digital code or decreasing a minimum digital code below a minimum available digital code.

A method for waveform scaling in a wireless device is also disclosed. The magnitude of a peak digital code is increased beyond a maximum available digital code for transmit power levels below a transmit power threshold to produce an adjusted digital code. The magnitude of the peak digital code is not increased beyond the maximum available digital code for transmit power levels above the transmit power threshold. The adjusted digital code is converted into an analog signal.

A wireless device for waveform scaling is also disclosed. The wireless device includes means for increasing a magnitude of a peak digital code beyond a maximum available digital code for transmit power levels below a transmit power threshold to produce an adjusted digital code. The magnitude of the peak digital code is not increased beyond the maximum available digital code for transmit power levels above the transmit power threshold. The wireless device also includes means for converting the adjusted digital code into an analog signal.

A computer program product for waveform scaling is also disclosed. The computer-program product includes a non-transitory computer-readable medium having instructions thereon. The instructions include code for causing a wireless device to increase a magnitude of a peak digital code beyond a maximum available digital code for transmit power levels below a transmit power threshold to produce an adjusted digital code. The magnitude of the peak digital code is not increased beyond the maximum available digital code for transmit power levels above the transmit power threshold. The instructions also include code for causing the wireless device to convert the adjusted digital code into an analog signal.

BRIEF DESCRIPTION OF THE DRAWINGS

FIG. 4A is a waveform diagram illustrating transmit power as a function of look up table (LUT) index in a wireless transmitter during beta scaling;

FIG. 4B is a waveform diagram illustrating transmit power back off as a function of look up table index in a wireless transmitter during beta scaling;

FIG. 5A is a waveform diagram illustrating transmit power as a function of look up table index in a wireless transmitter during phase rotation;

FIG. 5B is a waveform diagram illustrating transmit power back off as a function of look up table index in a wireless transmitter during phase rotation;

FIG. 5C is a waveform diagram illustrating a phase of a baseband waveform as a function of look up table index in a wireless transmitter during phase rotation;

FIG. 6A is a waveform diagram illustrating transmit power as a function of look up table index in a wireless transmitter during waveform scaling;

FIG. 6B is a waveform diagram illustrating transmit power back off as a function of look up table index in a wireless transmitter during waveform scaling;

FIG. 6C is a waveform diagram illustrating a phase of a baseband waveform as a function of look up table index in a wireless transmitter during waveform scaling;

DETAILED DESCRIPTION

Radio frequency (RF) transmitters may have a wide range of transmit powers that they support. Furthermore, different performance metrics may be used at different parts of the power range. For example, at the high end of the range, the linearity of a wireless transmitter may be desirable. At the middle range, current consumption may be a differentiating characteristic. However, reducing current consumption in the middle range may be difficult. As requirements become more stringent, the performance of each block within a transceiver may be optimized.

The present systems and methods reduce current in a way that may be applicable to a variety of wireless transmitters. Specifically, the modulation depth of the digital signal driving the digital-to-analog converter (DAC) may be increased. Thus, for the same conditions, more signal current may be available from the DAC. This increased signal available from the DAC may generate higher power at the transmitter output if no other changes were made. Alternatively, the increased power may be paired with a reduction in the DAC analog current (e.g., from a 2.1V supply), which may reduce the overall current consumption of the transmitter. In other words, the reduced analog current with the increased modulation depth may keep the transmitter transmit power unchanged. Thus, the same transmit power may be obtained with lower current consumption from a device's battery.

Figure 1:
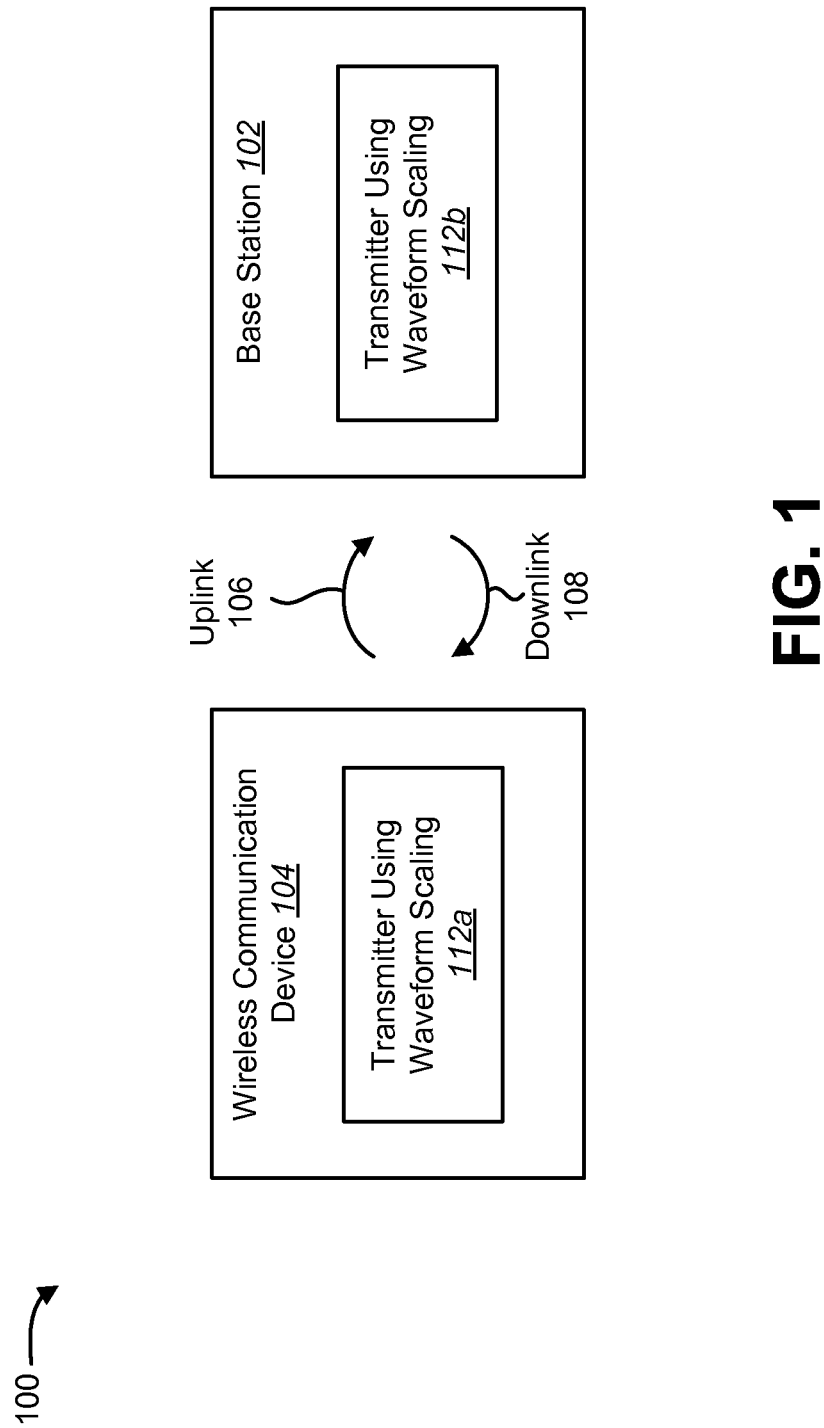
FIG. 1 is a block diagram illustrating a wireless communication system.

FIG. 1 is a block diagram illustrating a wireless communication system 100. A base station 102 may communicate with one or more wireless communication devices 104. The base station 102 may also be referred to as, and may include some or all of the functionality of, an access point, a broadcast transmitter, a Node B, an evolved Node B, etc. Each base station 102 may provide communication coverage for a particular geographic area.

A wireless communication device 104 may be referred to as, and may include some or all of the functionality of, a terminal, an access terminal, a user equipment (UE), a mobile device, a subscriber unit, a station, etc. The wireless communication device 104 may be a cellular phone, a personal digital assistant (PDA), a wireless device, a wireless modem, a handheld device, a laptop computer, etc. The wireless communication device 104 may communicate with zero, one or multiple base stations 102 on the downlink (DL) 108 and/or uplink (UL) 106 at any given moment using an antenna. The downlink 108 (or forward link) refers to the communication link from a base station 102 to the wireless communication device 104, and the uplink 106 (or reverse link) refers to the communication link from the wireless communication device 104 to the base station 102.

Current consumption in radio frequency (RF) transmitters may be measured and optimized to improve overall battery life. In one configuration, devices utilizing Wideband Code Division Multiple Access (WCDMA) networks may be expected to have about 8 hours of talk time on an 800 mAH battery. This may include about 100 mA for the RF circuitry and modem, of which the modem may consume 40 mA and the RF circuitry 60 mA. The transmit signal path may consume about 30% of this budget. One possible way to reduce power consumption in the transmitter is to lower the current consumed in the local oscillator (LO) path, the voltage controlled oscillator (VCO) or phase-locked loop (PLL).

In contrast, the present systems and methods use waveform scaling in the transmitter to reduce current consumption, i.e., the wireless communication device 104 and the base station 102 may have transmitters using waveform scaling 112a-b. Specifically, the digital code that drives a digital-to-analog converter in the transmitter using waveform scaling 112a-b is artificially scaled beyond a maximum available digital code, which allows the transmitter 112a-b to generate more power for the same amount of current.

The wireless communication system 100 may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems and spatial division multiple access (SDMA) systems.

Figure 2:
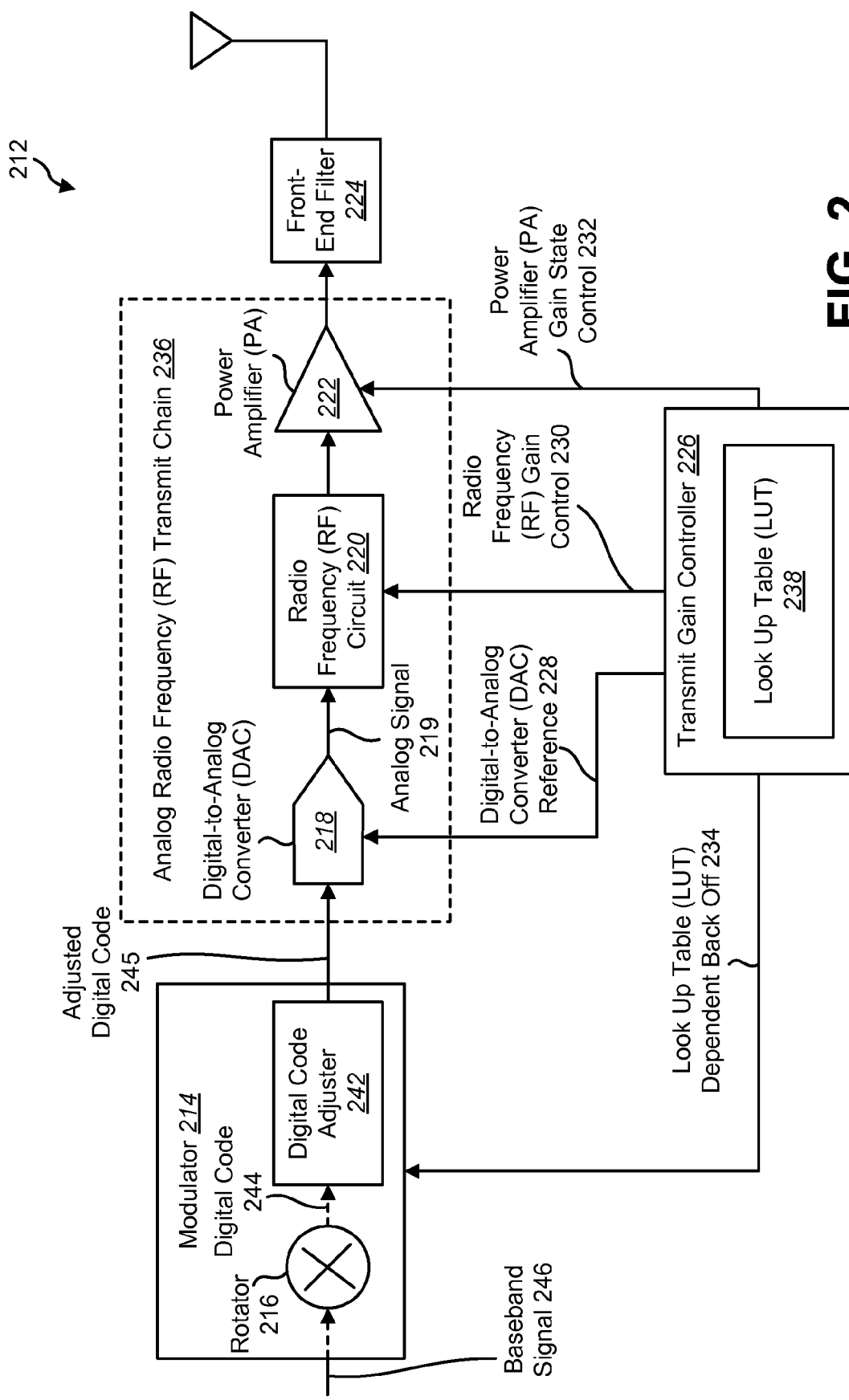
FIG. 2 is a block diagram of a transmitter using waveform scaling.

FIG. 2 is a block diagram of a transmitter 212 using waveform scaling. For example, the transmitter 212 may be included in a wireless communication device 104 or a base station 102. The transmitter 212 may include a modulator 214, an analog radio frequency (RF) transmit chain 236, a front-end filter 224 and a transmit gain controller 226. The analog RF transmit chain 236 may include multiple radio sub-blocks, i.e., a digital-to-analog converter (DAC) 218, a radio frequency (RF) circuit 220 or a power amplifier (PA) 222.

The analog RF transmit chain 236 may receive an adjusted digital code 245 from the modulator 214. The modulator 214 may receive a baseband signal 246, e.g., a voice signal or data intended for transmission. A rotator 216 may process the baseband signal 246 to produce a digital code 244 before a digital code adjuster 242 produces the adjusted digital code 245 for the analog RF transmit chain 236. The digital code 244 and the adjusted digital code 245 may be sequences of digital values. Therefore, the digital code 244, for example, may include a peak digital code (i.e., the highest digital value in the sequence of digital values) and a minimum digital code (i.e., the lowest digital code in the sequence of digital values). Likewise, the adjusted digital code 245 may include a peak adjusted digital code and a minimum adjusted digital code.

The phase rotator 216 may take an incoming signal (e.g., the baseband signal 246) and adjust its phase. For the purpose of illustration, and without limitation, assume the un-rotated signal is represented as $s(t)=A(t)*exp(j*phase(t))$, where $A(t)$ is an amplitude and $phase(t)$ is the phase of the un-rotated signal. The phase rotator 216 may shift the signal to create a new phase-rotated signal, e.g., $s\_phase\_rotated(t)=A(t)*exp(j*phase(t)+phase\_shift)$. This rotation may compensate for any phase shift that may be introduced in the RF circuit 220 as power level is changed. This may help a transmitter meet certain expectations for output phase variation as a function of output power.

The digital code 244 may be adjusted in multiple ways. In one configuration, the digital code 244 is adjusted using beta scaling, phase correction or both. In addition, the present systems and methods scale the digital code 244 beyond a maximum available digital code to drive the DAC 218 beyond allowable limits. Transmitter 212 linearity may be utilized at peak transmit power to ensure robust transmissions. However, current consumption of wireless devices may be evaluated at talk time. Since wireless devices may operate below peak power (e.g., 20 dB below peak power) during talk time, the waveform scaling of the present systems and methods may be performed for transmit power levels below a particular power threshold, but not for transmit power levels above the threshold, e.g., it may be applied at talk time transmit power level, but not peak transmit power level. At talk-time, the power amplifier may also be switched to a lower gain state, which permits this waveform scaling without adverse effects that may be present at peak transmit power where linearity is relied upon.

As illustrated below, this waveform scaling may cause clipping in the adjusted digital code 245, which permits greater power to be generated by the transmitter 212 for the same amount of current, thus reducing current consumption in the transmitter 212. This waveform scaling may be performed using a look up table (LUT) dependent back off signal 234 from the transmit gain controller 226. For example, the look up table 238 may be modified to scale the digital code 244 beyond an available code for transmit power levels below a power threshold, but not for transmit power levels above the power threshold.

The digital-to-analog converter (DAC) 218 may receive the adjusted digital code 245 and convert it into an analog signal 219. Following the DAC 218, the radio frequency (RF) circuit 220 may process the analog signal 219. The RF circuit 220 may receive an incoming signal (e.g., the analog signal) from the DAC 218 and upconvert it to RF, e.g., by using a mixer. The RF circuit 220 may also have some gain following upconversion, which may include some matching elements to match the output impedance of the RF circuit 220 to the power amplifier 222. Following the RF circuit 220, the power amplifier 222 may adjust the power of the RF signal before the front-end filter 224 filters the power amplified RF signal.

The wireless transmitter 212 may modify the gain state of radio frequency (RF) sub-blocks as a function of transmit power, i.e., the transmit gain controller 226 may send control signals to the sub-blocks within the analog RF transmit chain 236. This may include using the look up table (LUT) 238, e.g., a list of states for radio blocks in the transmitter 212 per desired power level. For example, the look up table 238 may encode gains and other operating conditions for the range of transmit power. Specifically, the transmit gain controller 226 may send a digital-to-analog converter reference signal 228, an RF gain control signal 230 and a power amplifier (PA) gain state control 232 to the DAC 218, RF circuit 220 and power amplifier 222, respectively. These control signals may be determined based on the look up table 238 that is indexed by desired transmit power level.

Figure 3:
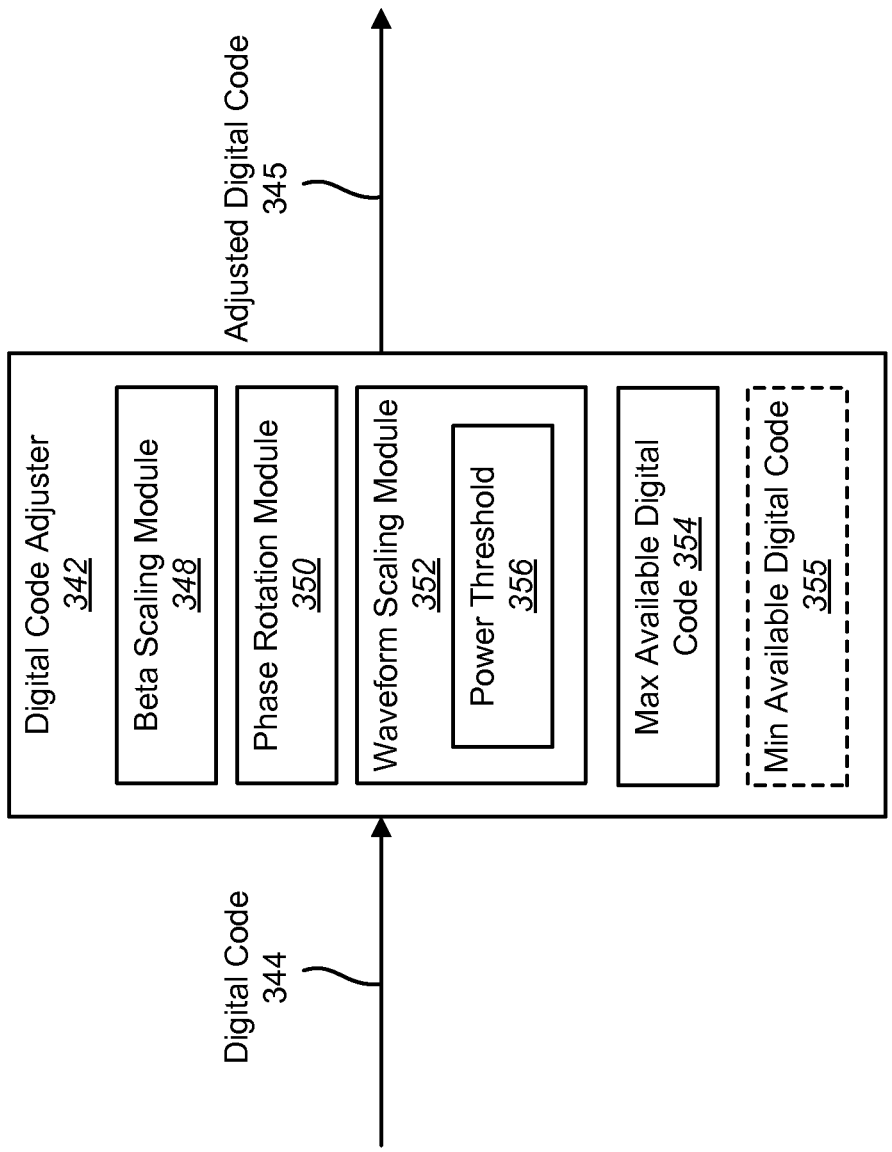
FIG. 3 is a block diagram of a digital code adjuster.

FIG. 3 is a block diagram of a digital code adjuster 342. The digital code adjuster 342 may be included in a wireless transmitter 212, e.g., as part of a wireless communication device 104 or base station 102. The digital code adjuster 342 may receive a digital code 344 and output an adjusted digital code 345, e.g., for an analog radio frequency (RF) transmit chain 236.

To adjust the digital code 344, beta scaling, phase rotation or both may be performed. A beta scaling module 348, as described below, may perform look up table (LUT) adjustment for minor inconsistencies in gain step across the transmit power range. A phase rotation module 350 may apply look up table (LUT) gain state dependent phase correction to the baseband signal.

Alternatively, or in addition to beta scaling and phase rotation, a waveform scaling module 352 may apply LUT-dependent scaling of the digital code 344 at transmit power levels below a power threshold 356. For example, the waveform scaling module 352 may scale the digital code 344 to a value above a maximum available digital code 354 or less than a minimum available digital code 355, e.g., the magnitude of the peak adjusted digital code may be larger than the peak digital code. In this configuration, a digital-to-analog converter 218 receiving the adjusted digital code 345 may reduce the analog current consumed. The reduced analog current consumption in conjunction with the increased modulation depth (i.e., the adjusted digital code 345 being scaled beyond the maximum available digital code 354 or less than the minimum available digital code 355) may combine to keep the transmit power unchanged while reducing current consumed in a wireless transmitter 212. The maximum available digital code 354 may be 2048, 4096, 8192 or another power of 2 value. The minimum available digital code 355 may be −2048, −4096, −8192, or another negative power of 2 value. The waveform scaling may be performed only for transmit power levels below a power threshold 356, e.g., the power threshold 356 may be 20 dB below peak transmit power.

FIG. 4A is a waveform diagram illustrating transmit power 456 as a function of look up table (LUT) index 458a in a wireless transmitter during beta scaling. As illustrated, the transmit power 456 may increase proportionally with the look up table (LUT) index 458a. Wireless standards may require power control between successive LUT entries, i.e., power in successive LUT states may be expected to be separated by 1 dB. A digital-to-analog converter (DAC) 218 may have a digital-to-analog gain, i.e., how much analog signal 219 will be generated for a maximum available digital code 354 (e.g., as defined by a modem). Therefore, the DAC 218 gain may be fixed and the digital code driving the DAC 218 may be modified to fine tune the gain of the DAC 218. However, there may be minor inconsistencies in the operation of the DAC 218.

FIG. 4B is a waveform diagram illustrating transmit power back off 460 as a function of look up table (LUT) index 458b in a wireless transmitter during beta scaling. To counter minor inconsistencies in the operation of the DAC 218, beta scaling may apply a small scaling factor in the modulator (or modem) 214 to adjust for minor inconsistencies across the transmit power range, i.e., beta scaling applies different baseband gain across different gain states. In other words, beta scaling may adjust the digital code (e.g., the adjusted digital code 345) driving the DAC 218 to adjust the output of the DAC 218 incrementally. The differences in the base band gain may be less than two times the gain difference across two gain states (e.g., LUT states). The change in back off 460 may not be correlated with transmit power. Across different wireless devices, beta scaling may use different back off for the same pair of LUT entries. This is because each wireless device may use a different (and hence unique) copy of the RF circuit 220. Therefore, each copy of the RF circuit 220 may generate slightly different power for an LUT entry due to variations in process, temperature, etc. Beta scaling is a method to correct for this and may be slightly different in different wireless devices.

FIG. 5A is a waveform diagram illustrating transmit power 556 as a function of look up table index 558a in a wireless transmitter during phase rotation. As illustrated, the transmit power 556 may increase proportionally with the look up table index 558a.

FIG. 5B is a waveform diagram illustrating transmit power back off 560 as a function of look up table index 558*b* in a wireless transmitter during phase rotation. As illustrated, the transmit power back off 560 may not be affected during phase rotation.

FIG. 5C is a waveform diagram illustrating a phase of a baseband waveform 562 as a function of look up table index 558*c* in a wireless transmitter during phase rotation. In addition to amplitude, a signal generated by a wireless transmitter 212 may also have a phase. For example, a base station 102 receiving a wireless signal may expect that the phase in between transmissions using successive look up table entries 558*c* will not change very much. In one configuration, the digital code of the DAC 218 is modified slightly to correct for phase discontinuities across LUT states (i.e., LUT indexes 558*c*). For example, the phase discontinuities may be within certain limits to avoid failing specifications in High Speed Packet Access (HSPA) and Long Term Evolution (LTE).

FIG. 6A is a waveform diagram illustrating transmit power 656 as a function of look up table index 658*a* in a wireless transmitter during waveform scaling. As illustrated, the transmit power 656 may increase proportionally with the look up table index 658*a*. Additionally, in the illustrated configuration, the state used for talk time 657 may be at look up index 658*a* number 6, which specifies a transmit power 656 of −8 dBm.

FIG. 6B is a waveform diagram illustrating transmit power back off 660 as a function of look up table index 658*b* in a wireless transmitter during waveform scaling. In waveform scaling, the digital code driving the DAC 218 may be aggressively scaled (as opposed to fine tuning as in beta scaling). Device current consumption may be measured at a transmit power level below peak power since, during use, the device is rarely at the very edge of its coverage (where is would require maximum transmit power 656). Linearity may be a higher priority at peak transmit power 656 than at lower transmit power 656 where current consumption is measured. At lower transmit power 656, linearity may be sacrificed slightly in order to reduce current consumption.

Therefore, the present systems and methods may, at transmit powers below peak transmit power 656, change the digital code driving the DAC 218 to a point where it is intentionally clipping, e.g., the magnitude of the peak code (e.g., the peak adjusted digital code) going into the DAC 218 is increased in the digital domain beyond the maximum available code 354. By doing so, the DAC 218 may be driven harder, and thus generate a larger output for the same current consumption. Therefore, to generate the same transmit power 656, the DAC 218 may consume less current.

In other words, for transmit powers 656 where linearity is important (i.e., at peak transmit power 656 and close to it), waveform scaling may not be used. This is indicated by waveform 661. The waveforms 661, 663 illustrate digital codes (e.g., the adjusted digital code 345) in the numerical domain, where the horizontal dotted lines indicate the maximum available digital code 354 and a minimum available digital code 355. As illustrated by waveform 661, at look up table indexes 658*b* of 6 and above, waveform scaling may not be performed, i.e., the digital code for driving a DAC 218 (e.g., the adjusted digital code 345) is not scaled beyond the maximum available digital code 354 and a minimum available digital code 355.

However, for transmit powers 660 where reducing current consumption is a higher priority than linearity (e.g., at transmit power 656 below peak transmit power 656), waveform scaling may be used. For example, this may include multiplying the magnitude of the digital code for driving a DAC 218 (e.g., the adjusted digital code 345) by a scalar between 1.0 and 2.0, e.g., 1.2. In one configuration following waveform scaling, the peak digital code may be multiplied beyond a maximum available digital code (other digital values within the digital code 244 may also be multiplied to exceed the maximum available digital code), i.e., the peak adjusted digital code exceeds the maximum available digital code (or a minimum adjusted digital code falls below a minimum available digital code). In contrast to beta scaling illustrated in FIG. 4B, the step in back off 660 during waveform scaling is greater than two times the gain delta required by wireless standards across successive steps. In other words, beta scaling may be used for fine tuning to ensure that the transmit power 656 between successive look up table indexes 658 is fixed, i.e., the difference in baseband gain is less than two times the gain difference across two successive LUT gain states. In contrast, the step in back off 660 during waveform scaling is greater than two times the gain delta required by standards across successive steps.

Beta scaling and waveform scaling, as described herein, are different in the following ways. Beta scaling may be used in WAN standards where strict output power control is desired. The RF circuit 220 may be unable to provide this on its own. Therefore, beta scaling may be used to perform a fine adjustment on the final output power. The WAN standards may specify both nominal gain step size for the transmitter and the gain step accuracy. Beta scaling may adjust the nominal step size by scaling the signal by 50% of the delta between successive steps. For example WCDMA may use 1 dB gain steps with 0.5 dB gain step accuracy. If two successive LUT entries are separated by 0.3 dB (more than a 0.5 dB error), then beta scaling may be used to shift one of the entries by 0.2 dB, thus making it compliant with WCDMA requirements. In this case the scaling in the digital domain was less than half of the gain step used by the standard. Another consideration in beta scaling is to maintain good linearity of the signal coming out of the digital code adjuster 242. The scaled signal (e.g., the adjusted digital code 245) is not clipped to avoid distorting the signal. The present systems and methods is distinct from beta scaling in that it will save current by scaling the digital signal up so that there is clipping and distortion. Furthermore in order to save current, the present systems and methods (i.e., waveform scaling) use the digital code adjuster 245 to scale up the LUT entries by at least one entire gain step, if not more. Therefore, the amount of scaling is larger, by definition, in waveform scaling of the present systems and methods than in beta scaling.

As illustrated by waveform 663, at look up table indexes 658*b* of 5 and below, waveform scaling may be performed to scale the digital code for driving a DAC 218 (e.g., the adjusted digital code 345) beyond the maximum available digital code 354 and a minimum available digital code 355, i.e., clipping may occur due to the waveform scaling. This allows the same transmit power 656 from a wireless transmitter 212 while consuming less current than without waveform scaling.

FIG. 6C is a waveform diagram illustrating a phase of a baseband waveform 662 as a function of look up table index 658*c* in a wireless transmitter during waveform scaling. As illustrated, the phase of baseband waveform 662 may not be affected during phase rotation.

Figure 7:
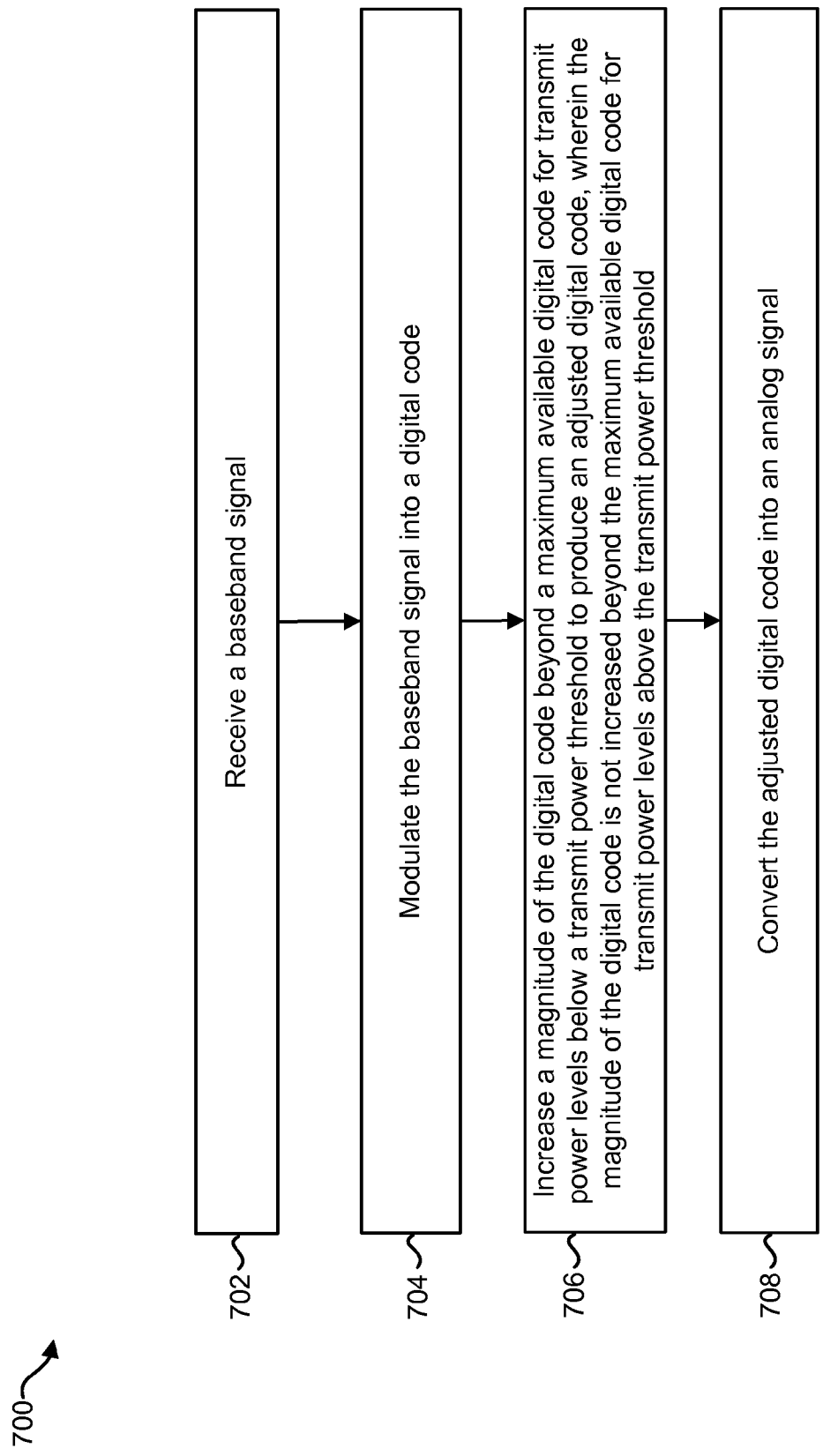
FIG. 7 is a flow diagram illustrating a method for waveform scaling.

FIG. 7 is a flow diagram illustrating a method 700 for waveform scaling. The method 700 may be performed by a wireless transmitter 212. In some configurations, the method 700 may be performed specifically by a modulator (or modem) 214.

The wireless transmitter 212 may receive 702 a baseband signal 246. The baseband signal 246 may be voice or data that is intended for wireless transmission across a wireless channel. The wireless transmitter 212 may also be modulated 704 into a digital code 344. The wireless transmitter 212 may also increase 706 a magnitude of the peak digital code beyond a maximum available digital code 354 for transmit power levels below a transmit power threshold 356 to produce an adjusted digital code 345. The magnitude of the peak digital code may not be increased beyond the maximum available digital code 354 for transmit power levels above the transmit power threshold 356. In other words, waveform scaling may be used for transmit powers where reducing current consumption is a higher priority than linearity, e.g., at a transmit power level 20 dB below peak transmit power. In contrast, waveform scaling may not be performed for transmit powers where linearity in the wireless transmitter 212 is a higher priority than reducing current consumption, e.g., at peak transmit power. The waveform scaling may be particularly beneficial when applied around the transmit power level where most wide area networks (WANs) have the highest probability of voice traffic. Since cell phone towers are typically placed densely in urban and sub-urban areas, the power used most frequently for voice traffic may be at least 20 dB below the maximum transmit power of the wireless device, e.g., the maximum transmit power may be determined by the power amplifier 222 of the transmitter 212. Therefore, the exact power threshold 356 for determining whether to perform waveform scaling may be a function of application (e.g., WAN, WLAN, etc.), the location of access points or cell phone base stations and the kind of traffic (e.g., voice or data) for which optimum current consumption is desired.

In addition to waveform scaling, the wireless transmitter 212 may also adjust the digital code 344 when beta scaling, phase rotating or both. The wireless transmitter 212 may also convert 708 the adjusted digital code 345 into an analog signal 219. The analog signal 219 may be used to generate a radio frequency signal for wireless transmission. In one configuration, the DAC 218 is a circuit that converts the digital code 244 or the adjusted digital code 245 into a corresponding scaled current. However, DACs used in wireless chips may alternatively use a voltage mode architecture or direct up-conversion architecture. The present systems and methods may be used with any suitable DAC 218 configuration.

Figure 8:
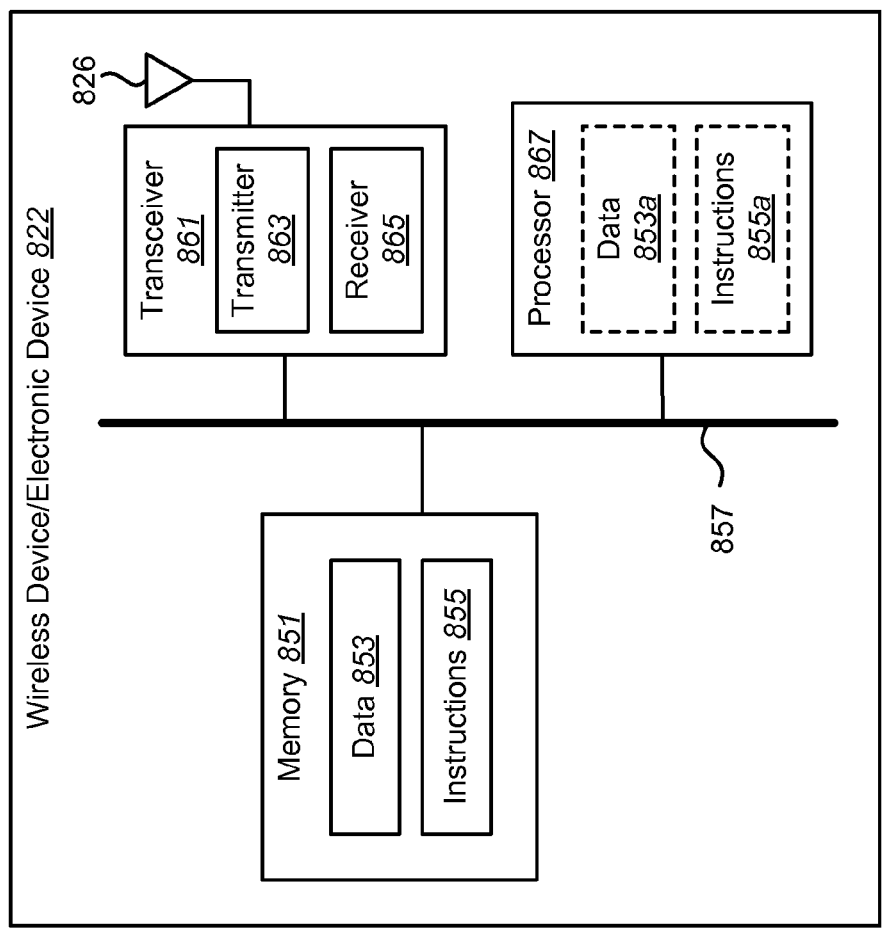
FIG. 8 illustrates certain components that may be included within an electronic device/wireless device.

FIG. 8 illustrates certain components that may be included within a wireless device 822. The wireless device/electronic device 822 may be a wireless communication device 104 or a base station 102 as illustrated in FIG. 1.

The wireless device/electronic device 822 includes a processor 867. The processor 867 may be a general purpose single- or multi-chip microprocessor (e.g., an ARM), a special purpose microprocessor (e.g., a digital signal processor (DSP)), a microcontroller, a programmable gate array, etc. The processor 867 may be referred to as a central processing unit (CPU). Although just a single processor 867 is shown in the wireless device/electronic device 822 of FIG. 8, in an alternative configuration, a combination of processors (e.g., an ARM and DSP) could be used.

The wireless device/electronic device 822 also includes memory 851 in electronic communication with the processor 867 (i.e., the processor 867 can read information from and/or write information to the memory 851). The memory 851 may be any electronic component capable of storing electronic information. The memory 851 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 853 and instructions 855 may be stored in the memory 851. The instructions 855 may include one or more programs, routines, sub-routines, functions, procedures, etc. The instructions 855 may include a single computer-readable statement or many computer-readable statements. The instructions 855 may be executable by the processor 867 to implement the methods that were described above in connection with the access terminals 122. Executing the instructions 855 may involve the use of the data 853 that is stored in the memory 851. FIG. 8 shows some instructions 855a and data 853a being loaded into the processor 867.

The wireless device/electronic device 822 may also include a transmitter 863 and a receiver 865 to allow transmission and reception of signals between the wireless device/electronic device 822 and a remote location. The transmitter 863 and receiver 865 may be collectively referred to as a transceiver 861. An antenna 826 may be electrically coupled to the transceiver 861. The wireless device/electronic device 822 may also include (not shown) multiple transmitters, multiple receivers, multiple transceivers and/or multiple antennas.

The various components of the wireless device/electronic device 822 may be coupled together by one or more buses, which may include a power bus, a control signal bus, a status signal bus, a data bus, etc. For simplicity, the various buses are illustrated in FIG. 8 as a bus system 857.

The term "coupled" encompasses a wide variety of connections. For example, the term "coupled" should be interpreted broadly to encompass circuit elements directly connected to each other and circuit elements indirectly connected via other circuit elements.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless device for waveform scaling, comprising:
   a modulator that increases a magnitude of a peak digital code beyond a maximum available digital code for transmit power levels below a transmit power threshold to produce an adjusted digital code, wherein the magnitude of the peak digital code is not increased beyond the maximum available digital code for transmit power levels above the transmit power threshold, and wherein increasing the magnitude of the peak digital code comprises increasing the peak digital code beyond a maximum available digital code or decreasing a minimum digital code below a minimum available digital code; and
   a digital-to-analog converter that converts the adjusted digital code into an analog signal.

2. The wireless device of claim 1, wherein the modulator determines the adjusted digital code using a look up table that comprises entries based on transmit power levels.

3. The wireless device of claim 2, wherein the wireless device consumes less overall power at look up table entries when the magnitude of the peak digital code is increased beyond the maximum available digital code than when the magnitude of the peak digital code is not increased beyond the maximum available digital code.

4. The wireless device of claim 1, wherein the modulator modulates a received baseband signal and produces a digital code that comprises the peak digital code.

5. The wireless device of claim 2, wherein the increase of the peak digital code comprises scaling the magnitude of the peak digital code by at least as much as a gain step between successive entries in the look up table.

6. The wireless device of claim 1, wherein the transmit power threshold is 20 dB below a peak transmit power for the wireless device.

7. The wireless device of claim 1, wherein the maximum available digital code is 4096.

8. A method for waveform scaling in a wireless device, comprising:
   increasing a magnitude of a peak digital code beyond a maximum available digital code for transmit power levels below a transmit power threshold to produce an adjusted digital code, wherein the magnitude of the peak digital code is not increased beyond the maximum available digital code for transmit power levels above the transmit power threshold, and wherein increasing the magnitude of the peak digital code comprises increasing the peak digital code beyond a maximum available digital code or decreasing a minimum digital code below a minimum available digital code; and
   converting the adjusted digital code into an analog signal.

9. The method of claim 8, further comprising determining the adjusted digital code using a look up table that comprises entries based on transmit power levels.

10. The method of claim 9, wherein the wireless device consumes less overall power at look up table entries when the magnitude of the peak digital code is increased beyond the maximum available digital code than when the magnitude of the peak digital code is not increased beyond the maximum available digital code.

11. The method of claim 8, further comprising modulating a received baseband signal and to produce a digital code that comprises the peak digital code.

12. The method of claim 9, wherein the increasing of the peak digital code comprises scaling the magnitude of the peak digital code by at least as much as a gain step between successive entries in the look up table.

13. The method of claim 8, wherein the transmit power threshold is 20 dB below a peak transmit power for the wireless device.

14. The method of claim 8, wherein the maximum available digital code is 4096.

15. A wireless device for waveform scaling, comprising:
   means for increasing a magnitude of a peak digital code beyond a maximum available digital code for transmit power levels below a transmit power threshold to produce an adjusted digital code, wherein the magnitude of the peak digital code is not increased beyond the maximum available digital code for transmit power levels above the transmit power threshold, and wherein the means for increasing the magnitude of the peak digital code comprise means for increasing the peak digital code beyond a maximum available digital code or decreasing a minimum digital code below a minimum available digital code; and means for converting the adjusted digital code into an analog signal.

16. The wireless device of claim 15, further comprising means for determining the adjusted digital code using a look up table that comprises entries based on transmit power levels.

17. The wireless device of claim 16, wherein the wireless device consumes less overall power at look up table entries when the magnitude of the peak digital code is increased beyond the maximum available digital code than when the magnitude of the peak digital code is not increased beyond the maximum available digital code.

18. The wireless device of claim 15, further comprising means for modulating a received baseband signal and to produce a digital code that comprises the peak digital code.

19. The wireless device of claim 16, wherein the means for increasing of the peak digital code comprise means for scaling the magnitude of the peak digital code by at least as much as a gain step between successive entries in the look up table.

20. The wireless device of claim 15, wherein the transmit power threshold is 20 dB below a peak transmit power for the wireless device.

21. The wireless device of claim 15, wherein the maximum available digital code is 4096.

22. A computer program product for waveform scaling, comprising a non-transitory computer-readable medium having instructions thereon, the instructions comprising:

code for causing a wireless device to increase a magnitude of a peak digital code beyond a maximum available digital code for transmit power levels below a transmit power threshold to produce an adjusted digital code, wherein the magnitude of the peak digital code is not increased beyond the maximum available digital code for transmit power levels above the transmit power threshold, and wherein the code for causing the wireless device to increase the magnitude of the peak digital code comprises code for causing the wireless device to increase the peak digital code beyond a maximum available digital code or decrease a minimum digital code below a minimum available digital code; and code for causing the wireless device to convert the adjusted digital code into an analog signal.

23. The computer program product of claim 22, wherein the instructions further comprise code for causing the wireless device to determine the adjusted digital code using a look up table that comprises entries based on transmit power levels.

24. The computer program product of claim 23, wherein the wireless device consumes less overall power at look up table entries when the magnitude of the peak digital code is increased beyond the maximum available digital code than when the magnitude of the peak digital code is not increased beyond the maximum available digital code.

25. The computer program product of claim 23, wherein the instructions further comprise code for causing the wireless device to modulate a received baseband signal and to produce a digital code that comprises the peak digital code.

26. The computer program product of claim 23, wherein the code for causing the wireless device to increase the magnitude of the peak digital code comprises code for causing the wireless device to scale the magnitude of the peak digital code by at least as much as a gain step between successive entries in the look up table.

27. The computer program product of claim 22, wherein the transmit power threshold is 20 dB below a peak transmit power for the wireless device.

28. The computer program product of claim 22, wherein the maximum available digital code is 4096.

* * * * *